United States Patent [19]

Tyler

[11] 4,136,594
[45] Jan. 30, 1979

[54] CUTTING TOOL

[75] Inventor: Robert P. Tyler, Westminster, Mass.

[73] Assignee: Wallace Murray Corporation, Fitchburg, Mass.

[21] Appl. No.: 787,317

[22] Filed: Apr. 14, 1977

[51] Int. Cl.² .................. B27B 33/08; B27B 33/14
[52] U.S. Cl. ............................ 83/839; 144/241; 83/831
[58] Field of Search ............... 83/835, 839, 831; 144/241; 241/190

[56] References Cited

U.S. PATENT DOCUMENTS

| 2,736,352 | 2/1956 | Wright | 83/831 |
| 2,746,494 | 5/1956 | Cox | 83/831 |
| 2,797,052 | 6/1957 | Clark | 241/190 |
| 2,978,000 | 4/1961 | Raney | 83/831 |
| 3,675,693 | 7/1972 | I'Anson | 144/241 |

Primary Examiner—Donald R. Schran

[57] ABSTRACT

A cutting tool such as a circular saw or chain saw is composed of a support having one or more tapped cavities and a cutting element having an elongated threaded shank engaged in the cavity and having an enlarged head at an end of the shank projecting from the cavity.

15 Claims, 9 Drawing Figures

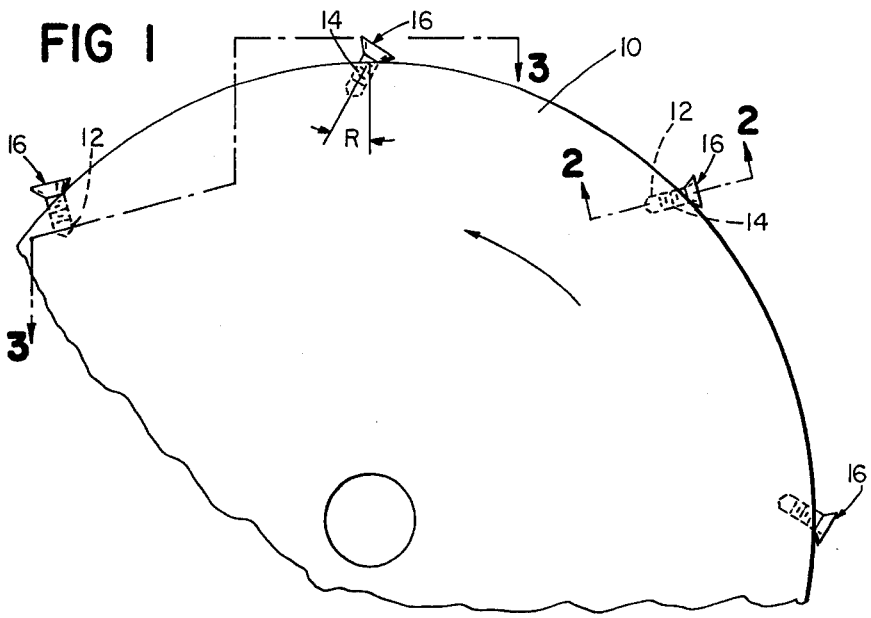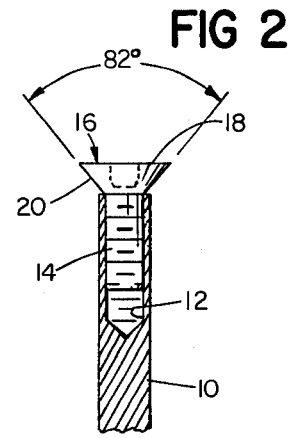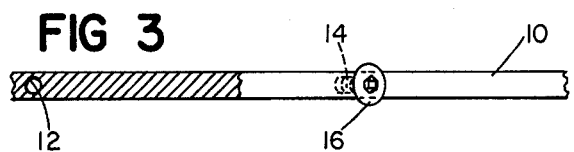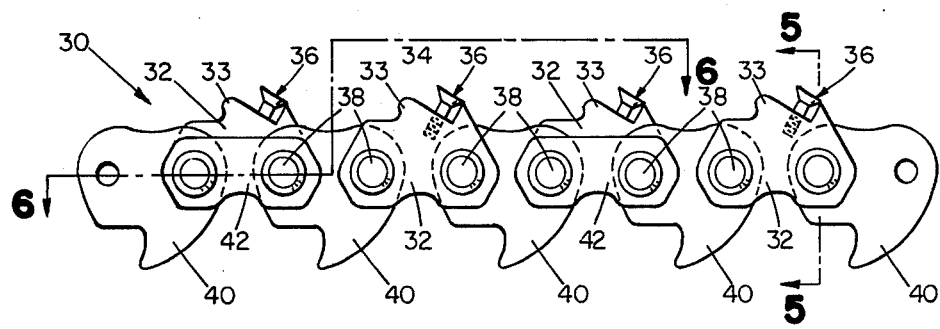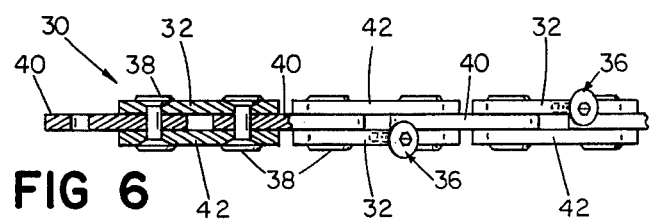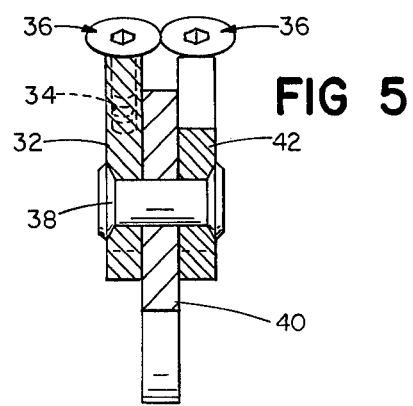

CUTTING TOOL

This invention relates to cutting tools and pertains more specifically to saw blades or units adapted for use in power driven rotary or chain saws. The cutting tools of the present invention, particularly in the form of chain saws, are especially effective in cutting wood, plastics and other similar relatively soft materials.

It has previously been proposed to provide saw blades in the form of steel plates having welded to their outer surfaces truncated spheres of hardened material as in Kolesh U.S. Pat. No. 3,537,491 and Tyler U.S. Pat. No. 3,788,182, and it has also been proposed to provide a paint scraper in the form of a wooden block studded with an array of protruding nail heads projecting from the block, as in Honick U.S. Pat. No. 3,838,509.

The present invention provides a cutting tool having a support member and cutting element of simplified and inexpensive construction which does not require welding during its manufacture, thus making possible the use of prehardened cutting elements and making possible easy replacement of one or more cutting elements which have become damaged or worn in use.

The cutting tool of the present invention comprises a support member for supporting and moving a cutting element in a cutting path, the support member having at least one tapped cavity, and a cutting element having an elongated threaded shank engaged in the cavity and having an enlarged head at an end of the shank projecting from the cavity.

In one embodiment of the invention, a circular saw blade is provided in the form of a generally circular plate of soft steel, aluminum, hard and rigid plastic, or the like, having at least one and preferably a plurality of tapped cavities adjacent its periphery extending inwardly away from the periphery and a machine screw having its threaded shank engaged in each tapped cavity and having a head of hardened steel. In another embodiment of the invention, a chain saw is provided in the form of an endless chain assembly of individual units pivotally connected together, at least one and preferably all of the units having a tapped cavity extending inwardly away from the outer periphery of the assembly, and a screw having a head of hardened steel and having its threaded shank engaged in the cavity. In every case, the screw is held in place in the cavity by threaded engagement therewith, with or without an adhesive cement, so that there is no necessity for welding or brazing; consequently, no softening of the previously hardened steel screw occurs during fabrication of the saw blade. Optionally, the screw is also secured in place by welding, brazing, or soldering, in which case any loss of temper is corrected by a subsequent hardening step. In order to provide effective cutting, the enlarged head of the cutting element must extend laterally beyond the side wall of the support member at least on one side. If the enlarged head projects only at one side, alternate cutting elements must project or extend at opposite sides of the support member, but in an alternative construction each cutting element is centered so that it projects equally at opposite sides of the support member.

The cutting elements employed in the present invention preferably are flat-headed machine screws, the flat outer face being connected to the elongated shank by a conical surface, and the arcuate intersection of the conical surface with the flat outer face serving as the cutting edge. There can be used conventional 82° or 100° machine screws having either slotted or recessed heads. Preferably, 82° hardened steel screws are used. The use of machine screws as cutting elements is advantageous in that the arcuate cutting edge can be sharpened simply by grinding or filing the flat outer face of the screw head. In the case of 82° flat head screws, the included angle between the conical surface and the axis of the shank of the screw is 41° and the included angle between the conical surface and the flat outer face of the screw is 49°. In the case of 100° flat head screws, the former angle is 50° and the latter angle is 40°. Generally speaking, each angle can vary from 40° to 50°.

The angular relation of the cavity (hence of the elongated shank of the screw) to the periphery of the support member can be varied at will to provide any desired degree of negative rake, from 5° to 40°, preferably from 25° to 35°, with respect to a line perpendicular to the direction of travel of the cutting element during use; in the case of a circular saw of the present invention, the rake angle is the angle formed by the elongated shank of the cutting element and a radius of the blade passing through the outer end of the cavity; in the case of a chain saw, the rake angle is the angle formed by the elongated shank of the cutting element and a perpendicular to the axis of a straight reach of the assembly of chain units. The rake angle of the cutting portion of the insert is dependent on the rake angle of the shank.

A particularly advantageous feature of the cutting tools of the present invention is the ability to cut wood in the direction of the grain with minimal plugging or clogging of the cutting elements. For maximum effectiveness in this respect the cutting element head is preferably mounted so that at least one-half of the periphery of the head lies above, i.e., outside the periphery of, the portion of the support member between the cutting elements; however, the cutting element is effective provided that any portion of the cutting edge extends outside the periphery of the support member during use.

Other and further features of the invention will be apparent from the drawings and from the following description of specific embodiments.

In the drawings,

FIG. 1 is a view in elevation, partly broken away, showing a circular saw blade embodying the invention;

FIG. 2 is a view in section on an enlarged scale taken along line 2—2 of FIG. 1;

FIG. 3 is a view taken along line 3—3 of FIG. 1;

FIG. 4 is a view in elevation, partly broken away, showing a chain saw embodying the invention;

FIG. 5 is a view in section taken along line 5—5 of FIG. 4;

FIG. 6 is a view taken along line 6—6 of FIG. 4;

Figure 7:
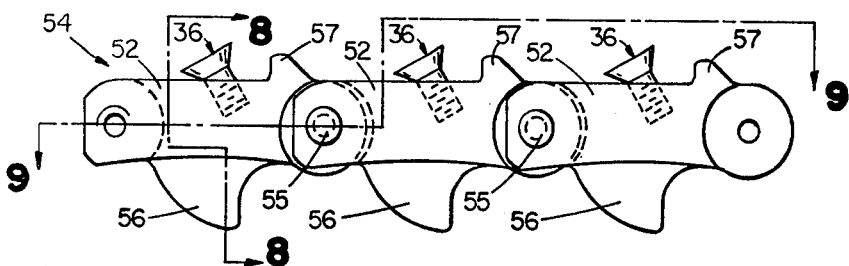
FIG. 7 is a view in elevation showing another embodiment of the invention in the form of a chain saw.

The embodiment illustrated in FIGS. 1 to 3 of the drawing is a circular saw blade comprising a support member in the form of a generally circular steel plate 10 having a plurality of tapped cavities 12 spaced along its periphery extending inwardly away from the periphery. Engaged in each cavity is the elongated threaded shank 14 of a hardened steel flat head 82° machine screw having an enlarged recessed head 16 at the end of the shank 14 projecting from the cavity. The flat outer face 18 of the screw head is connected to shank 14 by conical surface 20; the circular edge formed by the intersection of face 18 with surface 20 is the effective cutting edge. In the embodiment illustrated in FIG. 1, the direction of rotation of the blade in use is counterclockwise as shown by the arrow, and each cavity 14 is arranged with a negative rake angle R of 30°.

In manufacturing the blade of FIGS. 1 and 2, the plate is drilled and tapped at the desired intervals, and the periphery of the plate is relieved adjacent the mouth of each cavity if necessary to accommodate the screw head. The hardened steel screws have their flat outer faces ground if necessary and are then screwed into place, each being adjusted so that its arcuate cutting edge is the same distance from the axis of rotation of the blade so as to equalize as nearly as possible the cutting action of all of the cutting elements and the wear on each of them. If desired, any suitable adhesive may be applied to the screw threads as the screws are set in order to ensure that they do not fall out of adjustment during use on account of accidental rotation of the screws. Soldering, brazing or even welding can also be employed but is to be avoided if possible because the heat involved tends to draw the temper of the hardened steel screws, necessitating an additional hardening step after completion.

In FIGS. 4 to 6, there is shown an embodiment of the invention in which the support member takes the form of an endless chain assembly 30 having a plurality of units 32,32 each having a tapped cavity 34 which extends inwardly of the unit away from the outer periphery of the assembly. As viewed in FIG. 4, the outer periphery of the assembly is the uppermost side. Threadedly engaged in each cavity 34 is a machine screw 36 identical to that shown in FIG. 2. Each unit 32 is pivotally connected in the usual manner by pins 38,38 to guide elements 40,40 which are arranged to ride in the slot of a conventional cutter bar (not shown). Successive units 32 are disposed at laterally opposite sides of the intervening guide elements of the assembly and a link 42 is provided opposite each unit 32 to balance the assembly. In this embodiment the cutting edge of the screw or cutting element in each unit 32 extends laterally at one side only of the assembly, as shown in FIGS. 5 and 6 with the cutting edge of each successive unit extending at the opposite side of the assembly. As in the case of the circular saw blade of FIGS. 1-3, the height of the individual screw 36 can be adjusted by rotation, and each can be fixed in the desired position by adhesive or cement, etc. so that a portion of the cutting edge of each screw head is outside of the periphery of the support member when the latter is mounted with guide elements 40 riding in the slot of a cutter bar. However, precise positioning of the screw heads which form the cutting elements is not so important in the case of the chain saw assembly as in the case of the circular saw blade. Each screw 36 is mounted with its shank inclined inwardly and forwardly at an angle of 30° from a line perpendicular to the axis of a straight reach of the assembly, i.e., at a negative rake angle of 30°. Projecting portion 33 of each unit 32 serves to limit the depth of cut by the screw 36 mounted on the same unit 32, the depth of cut being determined by the vertical and lateral clearance between the cutting edge of screw 36 and the surface of portion 33 which bears against the material to be cut as the unit is advanced from right to left, as seen in FIG. 4, during use.

Figure 8:
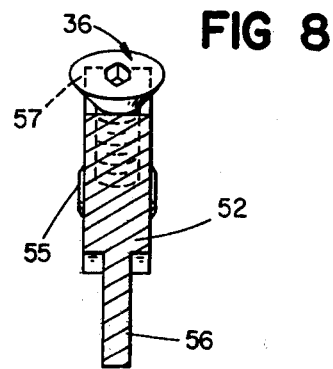
FIG. 8 is a view in section taken along line 8—8 of FIG. 7.
Figure 9:
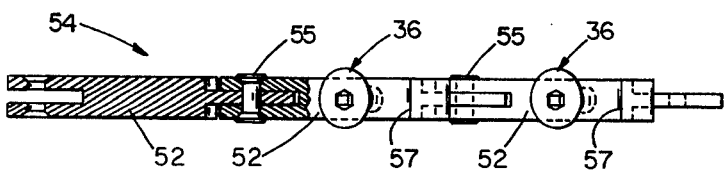
FIG. 9 is a view taken along line 8—8 of FIG. 7.

In the embodiment shown in FIGS. 7 to 9, each unit 52 of the chain saw assembly 54 carries both a screw 36, and a guide member 56 arranged to ride in the slot of a conventional cutter bar (not shown) and to be driven in the usual manner, the movement being from left to right as seen in FIG. 7 during the cutting operation. In this embodiment, units 52 are connected directly to each other by pins 55,55 and each screw or cutting element 36 is centered so that its cutting edge projects equally on opposite sides of the periphery of the assembly as well as extending beyond the upper surface of projection 57 which serves the same function as projecting portion 33 of units 32. In this embodiment, each successive individual unit of the assembly carries both a guide member and a cutting element in the form of a screw 36.

What is claimed is:

1. A cutting tool comprising a metallic support member for supporting and moving a cutting element in a cutting path, said support member having at least one tapped cavity, and
  a cutting element having an elongated threaded shank engaged in said cavity and having an enlarged head carrying a cutting edge at an end of said shank projecting from said cavity, said shank having a negative rake angle of 5° to 40°.

2. A cutting tool as claimed in claim 1 in the form of a circular saw blade in which said support member comprises a generally circular blade and said cavity is adjacent the periphery of the blade and extends inwardly away from its periphery.

3. A cutting tool as claimed in claim 1 in which said cutting element is composed of hardened steel.

4. A saw as claimed in claim 2 in which said cutting element is a screw having a head of hardened steel.

5. A saw as claimed in claim 4 in which said screw head has a generally flat outer face and a conical surface connecting the head to the shank.

6. A saw as claimed in claim 5 in which the included angle between said conical surface and the axis of said shank is from 40° to 50° and said outer face and said conical surface intersect to form a cutting edge, the included angle between said conical surface and said outer face being from 40° to 50°.

7. A cutting tool as claimed in claim 1 in the form of a chain saw in which said support member comprises an endless chain assembly comprising individual units pivotally connected together and said cavity extends inwardly of at least one said unit away from the outer periphery of said assembly.

8. A saw as claimed in claim 7 in which said cutting element is composed of hardened steel.

9. A saw as claimed in claim 7 in which said cutting element is a screw having a head of hardened steel.

10. A saw as claimed in claim 9 in which each successive individual unit of said endless chain assembly carrying a cutting element is arranged at laterally opposite sides of said assembly and the cutting element carried by said unit extends laterally beyond the periphery of the assembly at one side only thereof.

11. A saw as claimed in claim 9 in which each successive individual unit of said endless chain assembly carries a cutting element extending equally at both sides beyond the lateral periphery of the assembly.

12. A saw as claimed in claim 10 in which said screw head has a generally flat outer face and a conical surface connecting the head to the shank.

13. A saw as claimed in claim 12 in which the included angle between said conical surface and the axis of said shank is from 40° to 50° and said outer face and said conical surface intersect to form a cutting edge, the included angle between said conical surface and said outer face being from 40° to 50°.

14. A saw as claimed in claim 11 in which said screw head has a generally flat outer face and a conical surface connecting the head to the shank.

15. A saw as claimed in claim 14 in which the included angle between said conical surface and the axis of said shank is from 40° to 50° and said outer face and said conical surface intersect to form a cutting edge, the included angle between said conical surface and said outer face being from 40° to 50°.

* * * * *